Patented Jan. 21, 1941

2,229,204

UNITED STATES PATENT OFFICE 2,229,204

PREPARATION OF DEHYDRACETIC ACID

Albert B. Boese, Jr., Pittsburgh, Pa., assignor to Carbide and Carbon Chemicals Corporation, a corporation of New York No Drawing. Application June 6, 1936, Serial No. 83,930

13 Claims. (Cl. 260—344)

This invention relates to the controlled polymerization of diketene; and more especially it concerns the preparation of dehydracetic acid at elevated temperatures under conditions such that the rate of polymerization of the diketene to produce the said acid is greatly increased, and whereby the building up of an appreciable quantity of unpolymerized diketene in the reaction mixture is avoided.

Chick and Wilsmore, Jour. Chem. Soc. (London), vol. 93, page 950, describe the production of dehydracetic acid by reacting acetylketene and pyridine in benzene solution, evidently in the cold, and state that brown resins were formed when diketene was distilled under atmospheric pressure. Later the same authors produced dehydracetic acid by heating diketene in sealed tubes at 80° to 90° C., the reaction requiring two or three hours for completion under the pressure thereby developed. A considerable amount of brown resins concurrently were formed by undesired side reactions.

I have heated diketene in a sealed Pyrex tube at 80° to 90° C. for seven hours. There was no evidence of reaction other than a darkening in color of the liquid; and distillation of the material yielded about 75% of unchanged diketene and a residue of very impure dehydracetic acid. The results obtained by Chick and Wilsmore possibly may be explained by assuming that the polymerization was influenced by the catalytic action of the glass used. Their method obviously would not be suitable for the preparation of dehydracetic acid on a commercial scale, since the polymerization of undiluted diketene is exceedingly difficult to control and easily may become a violent reaction.

The polymerization of diketene at a satisfactory rate in an inert solvent in the cold in the presence of a catalyst also is attended with a certain degree of danger. I have discovered that, for certain obscure reasons, when diketene is added at room temperature to a solvent containing a catalyst, the polymerization reaction frequently does not begin until a large amount of diketene has been added. Then, when the polymerization once begins, the exothermic nature of the reaction makes it difficult to control, particularly when large quantities of diketene are involved.

The present invention is based in important part upon my discovery that it is possible to control and greatly increase the rate of polymerization of diketene to form dehydracetic acid in the presence of a polymerization catalyst while preventing the accumulation in the reaction mixture at any time of an appreciable quantity of unpolymerized diketene.

According to the invention, diketene is added slowly, or in successive small amounts, to a heated or actively refluxing solvent for the diketene, in the presence of a small amount or catalytic portion of a compound promoting the polymerization of the diketene. The diketene may be added either in undiluted form, or in solution in an inert diketene solvent, such as those named hereinafter, preferably at a rate at least approximately equal to that at which it is polymerized to form dehydracetic acid.

The solvent used is one which is inert to the diketene, and preferably one having a boiling point within the range from around 30° to around 150° C. Those boiling around 102° C. or below are especially suitable. Among suitable solvents may be mentioned aromatic hydrocarbons such as benzene, and toluene; and ethers such as dioxan, diethyl ether, diisopropyl ether, and di-n-butyl ether.

After the final addition of diketene, refluxing of the solution is continued until the diketene odor no longer is evident. The solution then may be cooled, whereupon the dehydracetic acid precipitates and may be removed by filtration. The filtrate then preferably is concentrated by distillation under vacuum and is cooled, whereupon a further quantity of dehydracetic acid is precipitated and is recovered.

If the original reaction mixture is first concentrated by distillation, the greater part of the dehydracetic acid crystallizes out in a rather high state of purity; and the remaining product then may be isolated by distilling off the solvent and fractionating the residue by vacuum distillation.

Among catalysts found suitable for use in the process are the alkali metal salts of organic hydroxylic compounds, for example, the alkali metal salts of phenols and aliphatic monohydric alcohols of the paraffin series, such as sodium phenolate and sodium ethylate; alkali metal hydroxides such as sodium and potassium hydroxide; and tertiary amines such as pyridine and its homologues, quinoline, N-ethyl morpholine and triethylamine. Alkali metal hydroxides, and alkali metal salts of such organic hydroxylic compounds as sodium phenolate and sodium ethylate may conveniently be designated, respectively, as compounds having the formula X·OA, wherein X represents a radical selected from the group consisting of hydrogen, alkyl $C_nH_{2n+1}$ radicals, and aryl $C_nH_{2n-7}$ radicals, and A represents an alkali metal.

The following examples will serve to illustrate the invention. It is to be understood, however, that the scope of the invention is not in any sense to be regarded as limited thereby.

*Example 1*

To 250 cc. of refluxing benzene containing 0.3 gram of sodium phenolate, 52 grams of diketene were added dropwise over a period of about one hour. The refluxing was continued until the diketene odor was no longer evident, requiring about thirty minutes. The solution, which was deep red in color, was cooled and separated from the precipitated dehydracetic acid by filtration. Upon further concentration of this filtrate, and distilling the residue under vacuum, a small additional quantity of dehydracetic acid was obtained, boiling at from 130° to 132° C. at 8 mm. of mercury absolute pressure. A total yield of dehydracetic acid of 65.4% thus was obtained.

*Example 2*

The diketene used in Example 1 had a purity of 90% to 95%. It was purified by fractional distillation to yield a purified diketene apparently containing at least 99% of diketene, and boiling at 54° C. under an absolute pressure of 48 mm. of mercury, and melting at −8° C.

Upon reacting 52 grams of this purified diketene under conditions similar to those described in Example 1, a yield of dehydracetic acid of 75.0% was obtained.

*Example 3*

To 150 cc. of dry refluxing benzene containing 0.2 gram of sodium phenolate, there was added dropwise over a period of an hour a solution of 75 grams of diketene in 75 cc. of benzene. Refluxing was then continued for one-half hour, after which the solution was concentrated by distillation and then cooled, upon which 43 grams of dehydracetic acid crystallized from the solution. It was recovered by filtration, and washed with a small amount of cold methanol. The washings were added to the filtrate, and the solution was further concentrated. From the concentrated liquor an additional 16 grams of dehydracetic acid separated on cooling. A 78.7% yield of dehydracetic acid melting at from 108° to 110° C. thus was obtained.

*Example 4*

Upon slowly adding 51 grams of diketene to 250 cc. of refluxing dioxan containing 0.3 gram sodium phenolate, and otherwise conducting the process under the conditions described in Example 1, a yield of 64.7% of dehydracetic acid was secured.

*Example 5*

Under conditions similar to those recited in Example 4, but using the purified diketene previously described, a yield of 71.1% of dehydracetic acid resulted.

*Example 6*

To 250 cc. of refluxing benzene containing 0.3% of pyridine was added dropwise 50 grams of diketene, the process being conducted under the same general conditions described in Example 1, supra. 30 grams of dehydracetic acid, corresponding to a yield of 60.0% thus were secured.

*Example 7*

Employing the general conditions of operation described in Example 6, with the exception that refluxing toluene was employed in place of benzene—from 52 grams of diketene, 23 grams of dehydracetic acid were obtained, corresponding to a yield of 44.3%.

*Example 8*

This experiment was conducted under the conditions recited in Example 6, excepting that refluxing dioxan was employed as the solvent. From 56 grams of diketene, 31 grams of dehydracetic acid, corresponding to a yield of 55.4%, were obtained.

*Example 9*

By substituting refluxing xylene for the dioxan, but otherwise conducting the process under the conditions described in Example 6, 58 grams of diketene produced 23 grams of dehydracetic acid—an overall yield of around 40%.

*Example 10*

To 250 cc. of refluxing benzene containing 0.3 gram of N-ethyl morpholine was added dropwise 55 grams of diketene. The process otherwise was conducted under the conditions recited in Example 1, producing 35 grams of dehydracetic acid, corresponding to a yield of 63.5%.

*Example 11*

Under conditions substantially identical with those employed in Example 10, but using 50 grams of the purified diketene hereinbefore described, there were obtained 39 grams of dehydracetic acid—a yield of around 78%.

*Example 12*

Under conditions generally similar to those described in Example 10, but utilizing refluxing dioxan as the solvent in place of benzene, 53 grams of diketene produced 32 grams of dehydracetic acid, a yield of over 60%.

*Example 13*

To 250 cc. of refluxing benzene containing 0.3 gram sodium hydroxide was slowly added dropwise 50 grams of diketene. Otherwise the process was conducted under the general conditions described in Example 1. A yield of dehydracetic acid of 28 grams or 56% was secured.

*Example 14*

The process was conducted under the conditions recited in Example 13, excepting that 0.3 gram of sodium ethylate was substituted for the sodium hydroxide catalyst. A yield of dehydracetic acid was obtained substantially the same as that secured in Example 13.

It will be observed that the yields of dehydracetic acid are substantially higher when employing purified diketene than when using the crude or impure material. Furthermore the boiling point of the solvent evidently has a definite effect upon the yield of dehydracetic acid. Those boiling at the lower end of the temperature range heretofore mentioned appear to facilitate the securing of high yields. The introduction of the diketene in the form of a solution thereof in an inert solvent also appears to favor high yields of dehydracetic acid.

The invention can effectively be employed for producing dehydracetic acid from impure diketene, or from mixtures containing diketene. Thus:

*Example 15*

To 1 liter of refluxing benzene containing 1.5 grams of sodium phenolate as catalyst was added dropwise 355 grams of diketene residues produced in the purification of diketene by fractional distillation of the latter under vacuum, as hereinbefore mentioned. The resultant liquid was refluxed for three hours and was then concentrated to 500 cc. and cooled. The dehydracetic acid thus crystallized out was separated by filtration, and was washed with cold methanol. The filtrate was further concentrated and yielded an additional quantity of dehydracetic acid. A total of 196 grams of the acid were secured, corresponding to a yield of 55.2%.

It is within the scope of the invention to maintain the solvent, during polymerization of the diketene, at a temperature below its refluxing temperature at atmospheric pressure or below, but within the preferred temperature range of from around 30° to around 150° C. Commercial scale operations, however, are favored by use of a solvent, the refluxing temperature of which under the conditions of use falls within the above-mentioned range; and those solvents which reflux in the neighborhood of 100° C. or below generally are preferred.

Other obvious methods for separating and recovering the dehydracetic acid from the polymerization reaction mixture will suggest themselves to those skilled in the art, and are intended to fall within the scope of this invention.

It is to be understood that the yields of dehydracetic acid recited in the examples are based upon the total weight of impure diketene added, and not upon the contained diketene. The values therefore are lower than would be the case if they had been calculated upon the basis of the actual diketene contained in the starting material. This is especially true of Example 15.

The invention is susceptible of modification within the scope of the appended claims.

I claim:

1. Process for producing dehydracetic acid by polymerizing diketene with the aid of heat and a catalyst, which comprises adding diketene to a heated inert solvent for diketene continuously maintained at a selected temperature within the range from around 30° C. to around 150° C., while applying heat to said solvent to maintain it at said temperature, in the presence of a polymerization catalyst, said diketene being added to said solvent at a slow rate approximately equal to the rate at which it is polymerized to form dehydracetic acid.

2. Process for producing dehydracetic acid, which comprises quickly distributing successive small portions of a solution of diketene in a volatile inert solvent therefor, within a body of an inert solvent for the diketene, the said body being continuously maintained at a selected elevated temperature within the range from around 30° C. to around 150° C., by heat applied to said body of solvent, in the presence of a polymerization catalyst, and recovering the dehydracetic acid thus produced.

3. Process for the polymerization of diketene, which comprises quickly distributing successive small portions of diketene within a body of a refluxing volatile solvent for the diketene which is inert to the latter, in the presence of a polymerization catalyst, while applying heat to the resultant mixture thereby maintaining the mixture at a temperature within the range of 30° C. to 150° C.

4. Process for the polymerization of diketene, which comprises distributing successive small portions of a solution of diketene in an inert volatile solvent therefor, within a hot body of a volatile inert diketene solvent, in the presence of a compound catalyzing the polymerization, while continuously maintaining the resultant mixture at a selected temperature within the range from around 30° C. to around 150° C. by heat applied to said mixture.

5. Process for the polymerization of diketene, which comprises distributing successive small portions of diketene within a hot body of benzene, in the presence of a catalytic portion of sodium phenolate, while maintaining the resultant mixture at an elevated temperature not substantially above the boiling point of benzene under atmospheric pressure.

6. Process for the polymerization of diketene, which comprises distributing successive small portions of diketene within a hot body of dioxan, in the presence of a catalytic portion of sodium phenolate, while maintaining the resultant mixture at an elevated temperature not substantially above the boiling point of dioxan under atmospheric pressure.

7. Process for producing dehydracetic acid, which comprises slowly adding small successive portions of diketene to a refluxing volatile solvent for the diketene which is inert thereto, and quickly intermixing the diketene and said solvent, while maintaining the resultant refluxing mixture at an elevated temperature not substantially above 150° C., in the presence of a basic polymerization catalyst selected from the class thereof designated by the formula X·OA, wherein X represents a radical selected from the group consisting of hydrogen, alkyl $C_nH_{2n+1}$ radicals, and aryl $C_nH_{2n-7}$ radicals; and A represents an alkali metal.

8. Process for producing dehydracetic acid, which comprises slowly adding and quickly intermixing small successive portions of diketene within a heated body of volatile solvent for the diketene which is inert thereto, while continuously maintaining the liquid mixture thus produced at a selected elevated temperature not substantially above 150° C., in the presence of a basic polymerization catalyst designated by the formula X·OA, wherein X represents a radical selected from the group consisting of hydrogen, alkyl $C_nH_{2n+1}$ radicals, and aryl $C_nH_{2n-7}$ radicals; and A represents an alkali metal.

9. Process for producing dehydracetic acid, which comprises quickly intermixing small successive portions of diketene with a body of a diketene solvent which is inert toward the diketene, in the presenc of a polymerization catalyst, the said body being continuously maintained at a selected temperature within the range from approximately 30° C. to approximately 150° C., by heating said body of solvent, and recovering the dehydracetic acid thus produced.

10. Process for producing dehydracetic acid, which comprises quickly intermixing small successive portions of diketene with a refluxing volatile solvent for the diketene which is inert toward the latter, while applying heat to said solvent to maintain the latter at the refluxing temperature.

11. Process for producing dehydracetic acid, which comprises slowly adding and quickly intermixing small successive portions of diketene with a refluxing inert volatile solvent for the diketene which contains a catalytic portion of a compound catalyzing the polymerization of the diketene to form dehydracetic acid, while heating said solvent, thereby maintaining the latter at the refluxing temperature.

12. Process for producing dehydracetic acid, which comprises slowly adding and quickly intermixing small successive portions of diketene with a refluxing volatile solvent for the diketene which is inert thereto, at an elevated temperature not substantially above 150° C., in the presence of a compound catalyzing the polymerization of the diketene, while heating said solvent to maintain it at the refluxing temperature, and recovering the dehydracetic acid thus produced.

13. Process for producing dehydracetic acid, which comprises quickly intermixing small successive portions of diketene with a volatile solvent for the diketene which is inert thereto, in the presence of a compound catalyzing the polymerization of the diketene to form dehydracetic acid, the said solvent boiling below around 150° C. and being continuously maintained at a selected temperature within the range from approximately 30° C. to approximately 150° C., by the application of heat to said solvent, and being selected from the class consisting of the aliphatic ethers.

ALBERT B. BOESE, Jr.